March 28, 1961 J. T. MULLIN 2,977,579
APPARATUS FOR MAGNETIC REPRODUCTION
Original Filed Sept. 7, 1954 2 Sheets-Sheet 1

INVENTOR.
John T. Mullin.
BY Lippincott & Smith
ATTORNEYS

March 28, 1961 J. T. MULLIN 2,977,579

APPARATUS FOR MAGNETIC REPRODUCTION

Original Filed Sept. 7, 1954 2 Sheets-Sheet 2

INVENTOR.
John T. Mullin.
BY
Lippincott & Smith
ATTORNEYS

United States Patent Office 2,977,579
Patented Mar. 28, 1961

2,977,579

APPARATUS FOR MAGNETIC REPRODUCTION

John T. Mullin, Los Angeles, Calif., assignor to Minnesota Mining and Manufacturing Company, St. Paul, Minn., a corporation of Delaware Continuation of application Ser. No. 454,440, Sept. 7, 1954. This application Dec. 9, 1958, Ser. No. 779,254

11 Claims. (Cl. 340—174.1)

This is a continuation of copending application Serial No. 454,440, filed September 7, 1954, by John T. Mullin, now abandoned, for Apparatus for Magnetic Reproduction.

This invention relates to methods and apparatus for magnetically recording and reproducing electrical signals, particularly signals where maintenance of relative amplitude is of primary importance. Examples of such signals are television signals, the amplitude of which, measured unidirectionally from an established black level, is representative of the amount of light emanating from the various picture elements scanned, and signals such as are developed in electrical analog computer practice, where the instantaneous amplitude of a signal (which may be either plus or minus) may represent the magnitude of a quantity entering into a computation. Telemetering signals are other examples of signals whose relative magnitude must be accurately preserved if they are to be of value.

The magnetic method of recording possesses, among others, the advantages of economy, wide dynamic range, and "correctability," meaning, by the latter, that the recorded signals may be edited and portions changed or erased if desired. These factors are of varying value in the recording of signals of different types. Wide dynamic range may not be necessary if the signals are quantized, and the ability to edit is not important in the case of telemetering signals. Nonetheless the magnetic method does possess advantages sufficient to lead to its adoption for all of the purposes mentioned.

For many of the purposes to which magnetic recording is adapted the preferred recording medium is coated plastic tape, wherein a magnetic material, usually an oxide or a mixture of oxides of iron, finely powdered and secured to the tape by an adhesive binder, is the actual recording medium, the tape serving as a carrier. Recording media of this type have the one great disadvantage that the record is subject to "drop outs," where the signals fail to record because of irregularities in the coating, particularly either "pin holes" or granules which lift the tape briefly from the recording head as they pass and cause the signals which should be imposed upon the tape in the vicinity of the granule to fade or disappear altogether. Other magnetic materials are also subject to drop outs, but in a lesser degree, but in general they are much more espensive and less convenient to handle than the coated plastic tape.

The primary object of the present invention is to provide a method of and apparatus for magnetically recording and reproducing signals whereby the effect of drop-outs is substantially eliminated. In so eliminating the effect of drop-outs, a further object of the invention is to provide a method of and apparatus for reproducing magnetically recorded signals whereby the amplitude relationships between the original signals and the reproduction thereof are accurately preserved. Further objects of the invention are to provide methods and apparatus applicable to signals of all frequencies which may be recorded magnetically, to provide insurance against drop-outs which involves a minimum of apparatus, straightforward engineering techniques, and which is simple and certain in operation, and to provide methods and apparatus which are equally effective whether the signals are representative of unidirectional departures of the quantity represented from a zero datum (e.g., illumination as represented by television signals) or are inherently bi-directional.

One characteristic which is inherent in magnetic recordings is that the direct current components of any signals which are recorded cannot be reproduced; the recording and reproduction system is basically an A.C. system, since the voltages developed in the transducer heads are produced by changes in the flux in the head. Consequently, in the reproduction of unidirectional signals, only the alternating components are reproduced and the very low frequencies must either be disregarded or be introduced artificially after reproduction as, for example, by a D.C. restorer. If, therefore, a drop-out does occur, both positive and negative halves of the A.C. component disappear. In the case of signals which are originally bidirectional this, of course, is equally true.

In accordance with the present invention, the signals to be reproduced are simultaneously recorded by substantially identical heads on a plurality of tracks. Drop-outs occur purely at random and, considering the amount of information which can be recorded on a relatively short track, they occur rather rarely. Accordingly, two tracks are ordinarily sufficient to insure that all information is recorded on either one or the other of these tracks. In cases where extreme reliability is required it may be advisable to add additional tracks, but the probability of simultaneous drop-out decreases enormously as tracks are added, and, as stated, for the very great majority of purposes, two nominally identical recordings are sufficient. In reproducing the signals a like plurality of transducer heads are used to pick up the nominally identical signals, any of which may, however, be distorted by drop-outs.

The signals from the two tracks are preferably first subjected to any necessary preamplification, in separate channels supplied by the respective transducer heads. While theoretically the technique of the present invention can be employed either before or after amplification of the signal, preamplification results in a better signal-to-noise ratio. Either within the preamplifier itself or immediately following it, the signals in each channel are divided into two paths, one path being provided for "positive" swings while the other path is provided for the "negative" swings in signal polarity. Such separation can be provided, for example, in a push-pull circuit, or it can be accomplished with a rectifier net. The positive signals and the negative signals from the two channels are then separately compared, and if there is any difference in amplitude between two signals of the same sign, only the greater of the two is fed into the output circuit. In practice the convenient way of comparing the signals of each sign is to supply them to the same load impedance through rectifiers which are similarly poled, so that where one signal does exceed the other, by even a very small amount, it will apply a reverse voltage to the rectifier connecting with the lower-voltage channel and hence it will neither supply current to the output impedance nor will it absorb power from the higher voltage channel. After the comparison and the selection of the higher potentials, positive and negative, the positive and negative halves are recombined in their proper relationship to supply a common output circuit. Where a rectifier network is used for separating the positive and negative halves of the cycle in each channel, the same rectifier used for the separation can also serve the purpose of the comparators.

An important point in connection with the operation of the system is that the impedances feeding the comparator circuit should be low in comparison with the load circuit which they feed. If the output impedance of the circuit feeding the comparators is matched to the impedance of the load circuit a very considerable advantage is obtained over series or parallel-connected circuits similarly matched or, of course, over a single circuit in which a drop-out exists. Where two channels are used to supply an impedance-matched output with the system of this invention a drop in signal level due to a complete drop-out in one channel will be less than 3 db., in comparison with at least 6 db. where two parallel circuits are connected without a comparator. Where low impedance circuits are used, however, to supply the load of the comparators the voltage drop due to a dropout in either channel can be made a small fraction of one percent.

The invention will be better understood from the following description of certain preferred embodiments thereof, taken in connection with the accompanying drawings wherein:

Fig. 1 is a schematic diagram of reproducing circuits in accordance with the present invention, as adapted for broad band signals, such as television signals, radar signals, or the like;

Figure 1:
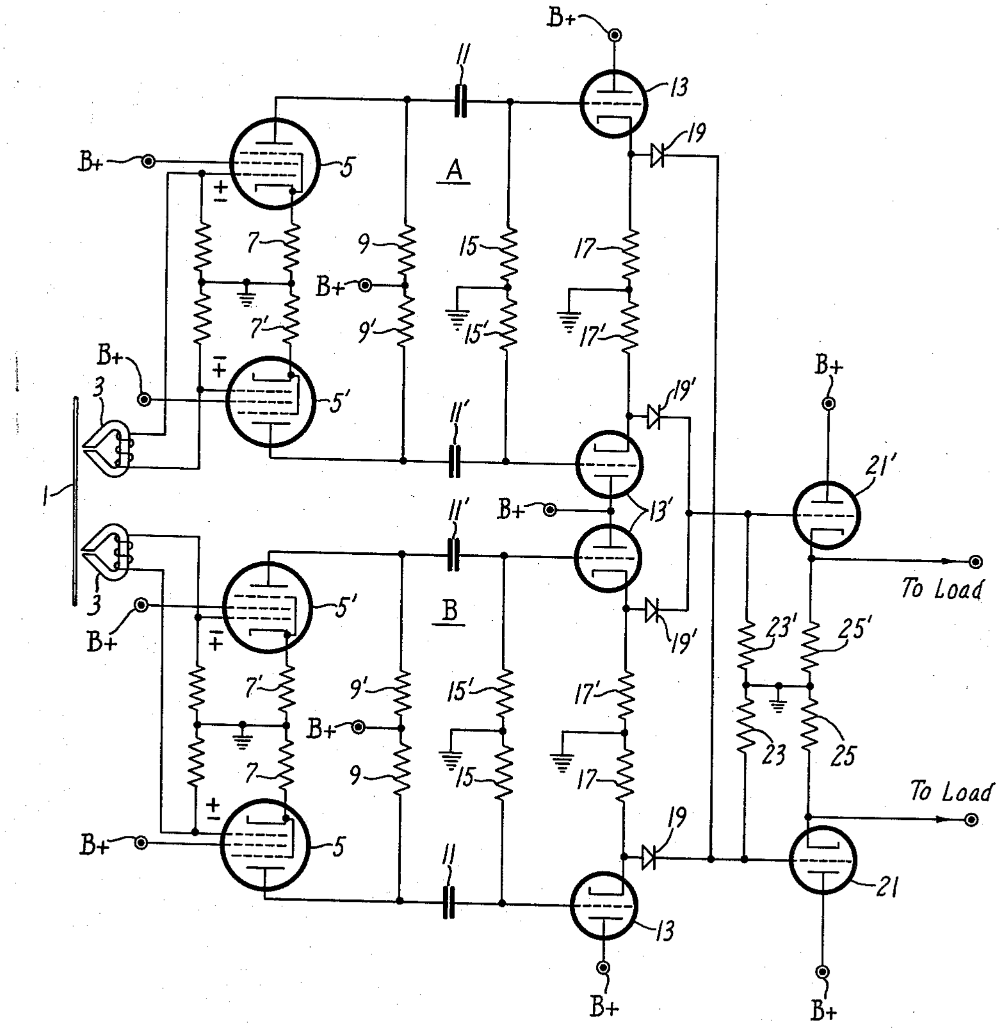

In the drawing of Fig. 1, as in all of the schematic diagrams in this application, the reference charatcer 1 indicates, in cross-section, a magnetic recording tape of conventional type. In accordance with well known practice such a tape is moved at constant speed past recording heads, from a feed-reel to a take-up reel, by a suitable drive mechanism. Because such mechanism is conventional and well known it is not illustrated in the schematic drawings.

Opposed to the tape, where they will engage the nominally identical tracks thereon which carry the signals to be reproduced, are substantially identical transducer heads 3. These heads connect through identical channels, identified as "channel A" and "channel B." Since the channels are identical the parts are identified by the same reference characters, no distinction being made between the two channels.

Each recording head feeds a push-pull amplifier, comprising tubes 5 and 5'. Each push-pull pair of tubes is preferably matched so as to have substantially the same characteristics. The connections to the tubes of each pair is such that the grids of both tubes 5 swing together, both going either positive or negative, as the case may be, at the same time. The same holds true of tubes 5'. Since high amplification is normally desirable in a preamplifier, the tubes shown are indicated as being pentodes, and in order to minimize differences in the performance of the amplifier, due to variation in tube characteristics, negative feedback is supplied to each through unbypassed cathode resistors 7, 7'. Each pair of tubes feeds a push-pull load circuit comprising resistors 9, 9' and their respective anodes connect through blocking condensers 11, 11' to the control grids of a pair of cathode follower tubes 13, 13'. The latter are provided with high-value grid resistors 15, 15'.

The use of the cathode follower tubes 13 as the output for the preamplifier is to provide a low effective internal impedance for the amplifier circuit. The cathode resistors 17, 17' provided for these tubes should preferably all have the same value to within relatively close limits, and in order to obtain minimum internal impedance for the circuit their resistance should match the apparent impedance of the tubes. This will give the tubes 13, 13' a voltage amplification of 0.5. It may not be necessary, in this specific case, to sacrifice this much voltage amplification; if the values of the resistors 17, 17' are several times the effective output resistances of the tube, the amplification of the tubes will approach unity and the output impedance of the amplifiers may still be low enough to gain a major portion of the value of the invention.

The output circuits for each of the tubes 13 are connected together, in each case through a rectifier 19, poled to pass the currents resulting when the cathodes of the tubes swing positive, and the output sides of the rectifiers 19 are connected together. The same holds true of the rectifiers 19', connected from the cathodes of tubes 13'. The output sides of rectifiers 19 are connected together and to the grid of a tube 21 while rectifiers 19' similarly connect to the grid of a tube 21'. Tubes 21 and 21' are also connected as cathode followers. Each is supplied with a high impedance grid resistor, 23, 23', which is grounded as are the cathode resistors 25, 25'.

Neither the heater nor the anode supply circuits are shown for any of the tubes that are here described; these being conventional, their showing would merely serve to confuse the drawing. Any conventional source can be connected to the various terminals marked "B+," B− being grounded. As is well known the effective input impedance of a cathode follower tube is extremely high. The values of the cathode resistors which bridge the impedance of these tubes should be of as high a value as is compatible with the particular tube used. Preferably it should be at least several hundred thousand ohms and may be a megohm or more if values as high as this are recommended for use with the particular tubes selected.

Let it now be assumed that, with the apparatus running and with the two transducer heads picking up nominally identical signals, that supplied to the pick-up head 3 of amplifier B is reduced in amplitude slightly, because of the approach of a defect in the coating in the tape 1. Let it also be assumed that at the instant that this takes place the grids of tubes 5 are swinging plus, while those of tubes 5' are swinging minus. The amplified signals will be applied to the grids of tubes 13 in negative phase, and to tubes 13' positively, but the signal applied to tube 13' of amplifier A will exceed that applied to amplifier B. Owing to the cathode follower connection, the cathodes of tubes 13' will also swing positively, and the two rectifiers 19' will tend to conduct.

The resistance of the two rectifiers can be assumed to be so low as to be negligible. The voltage available at the cathode of the tube connected to the A amplifier will therefore appear across the cathode resistor 23', which is so high in value that its conductance effectively shunted across that of the cathode resistors 17' may be neglected. This voltage, being higher than that appearing on the cathode of the B amplifier will produce a back potential, which will not only prevent its associated rectifier 19' from conducting in the forward direction but, being applied to that rectifier in reverse direction, will prevent the higher voltage output from the A amplifier being reduced through its being shunted by the cathode resistor of the B amplifier. The same effect will hold if the signal applied to the B amplifier drops to zero. If that applied to the A amplifier drops to zero the effect will, of course, be identical but the roles of the two amplifiers will be reversed.

While the above-described effects are occurring the cathodes of the amplifiers 13 are swinging negative, and since this is in the direction in which the rectifiers 19 do not conduct no voltage appears across the grid resistor 23 until the applied impulse changes in sign, when the functions of the circuits carrying the primed and unprimed reference characters are reversed.

The cathodes of tubes 21 and 21' connect to whatever load the device is designed to feed. It may be noted that although only one of the tubes 21, 21' is working at any one time, the impedance looking into the amplifier from the load is the sum of the impedance of the two halves of the circuit.

Figure 2:
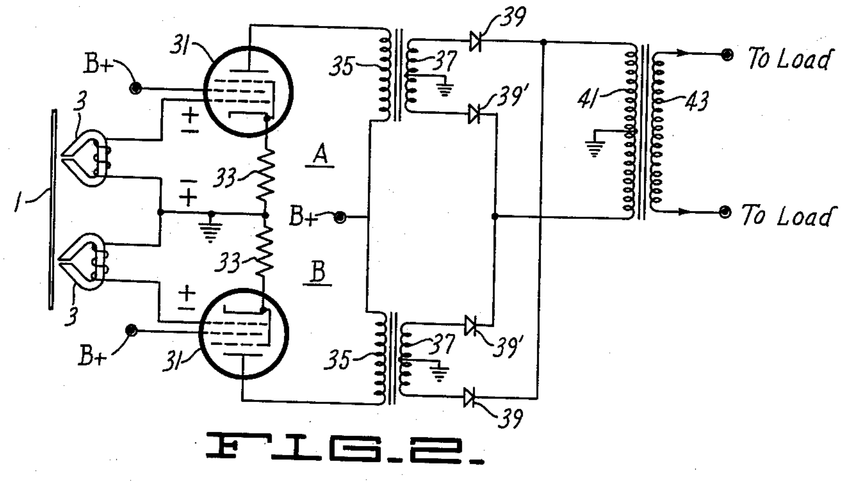
Fig. 2 is a similar diagram of the invention as embodied in a circuit adapted to pass narrower band signals, where transformer coupling of amplifiers is feasible.

When the frequency band which is to be reproduced is narrow enough so that it may be handled satisfactorily by transformer couplings a much simpler circuit, such as is illustrated in Fig. 2 may be used to effect the same results. Instead of each of the transducer heads 3 feeding a push-pull circuit, each feeds an asymmetrical circuit, the two channels again being designated as the A and B channels. Each transducer supplies a preamplifier tube 31, these tubes again being shown as pentodes having unbypassed cathode resistors 33, to provide negative feed-back and render their amplification less dependent upon tube characteristics. Note that in this instance the two tubes 31 are not connected in push-pull, but are in parallel and independent channels.

The anodes of the tubes 31 are connected to the primary coils 35 of transformers, each of which is provided with a low-impedance, center-tapped secondary 37, the center tap in each case being connected to ground. Each terminal of the secondary coils 37 connects through a similarly directed rectifier 39, 39'. The outputs of rectifiers 39 are connected together, as are the outputs of rectifiers 39'. The combined outputs of rectifiers 39 and 39' are connected respectively to opposite terminals of the center-tapped primary coil 41 of an output transformer, the secondary coil 43 of which connects to the output circuit supplying the load. The ratios of the three transformers are so chosen that the impedance looking into each half of the coils 37 is relatively low in comparison to that looking into each half of the coil 41.

It will be seen that the principal difference between the embodiments of the invention as shown in Figs. 1 and 2 resides in the portion of the circuit at which the positive and negative swings of the signal to be reproduced are separated. Although in both the figures that have been thus far described only a single stage of preamplification has been shown ahead of the circuits embodying the actual invention, additional stages of amplification can, of course, be employed.

The push-pull technique is merely one method of separating the positive and negative swings of the signal. It has been illustrated in the two embodiments of the invention thus far descrobed because it is well understood. It is also well understood that there are various methods of coupling asymmetrical circuits to balanced circuits, and whether transformers, inverter tubes, or other instrumentalities are used depends primarily upon the particular type of signals to be reproduced; any of these known techniques can be employed in connection with the present invention.

Figure 3:
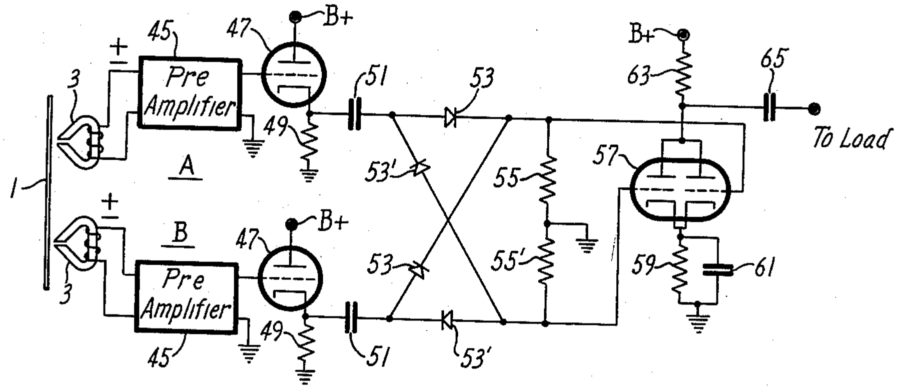
Fig. 3 is a schematic diagram of a broad-band reproducing circuit, wherein a rectifier network is utilized to separate the signals into positive and negative halves.

An entirely different method of separating the positive and negative swings of the signal, which does not employ the push-pull technique but uses single-sided circuits for all of the preamplification, as illustrated in Fig. 3 in a form which is applicable to wide band signals and is, for many purposes, the preferred embodiment of the invention.

In this embodiment the signals, picked up from the nominally identical tracks on the medium 1 by the transducer heads 3, are supplied to preamplifiers 45 of the A and B channels, and are fed to single-sided cathode follower output tubes 47, illustrated as triodes. Again the preamplifiers preferably embody enough negative feedback to insure substantially constant and equal gain, and the output tubes 47 are provided primarily to give low output impedance, the cathode resistors 49 preferably being of such value as to match the effective output impedance of the tube when used in a cathode-follower connection. The cathode circuit of each of the tubes 47 connects through a blocking condenser 51 to a rectifier network.

This network includes a "positively" poled rectifier 53 connecting from the output side of each condenser 51 to the same terminal of a high resistance 55, the other terminal of which connects to ground. It also includes a "negatively" poled rectifier 53' connecting from the output side of each condenser 51 to the terminal of a high resistance 55', which also has its other terminal connected to ground and the resistance of which is substantially equal to that of resistor 55, although if the resistances of both are sufficiently high an exact balance between the two is not particularly important. Connections from the undergrounded terminals of the resistors 55 and 55' connect, respectively, to the control grids of a dual tube (or of two similar single tubes) 57.

The two sections of tube 57 have both their cathodes and anodes connected in parallel, the cathodes in this case connecting through a common resistor 59, bypassed by a condenser 61, to ground. The two anodes, connected in parallel through an anode resistor 63, are connected to B+. The load circuit connects to the two anodes through a blocking condenser 65.

Although at first glance the connections between the cathodes of tubes 47 and the tube or tubes 57 looks like a push-pull circuit, it is not so in fact. When the cathode of either tube 47 swings positive, the resultant signal is applied through the corresponding rectifier 53 to the ungrounded end of resistor 55, but does not appear across resistor 55', being blocked by the rectifiers 53', which are oppositely poled. When the cathodes of tubes 57 swing negative, however, the signals are blocked by rectifiers 53 from resistor 55 but appear, through rectifiers 53' across resistor 55'. The two resistors 55 and 55' are therefore not connected in push-pull, but effectively in parallel being switched alternately into and out of the circuit by the action of the rectifiers.

As in the case of push-pull circuit, however, only the higher of two unequal voltages developed by the tubes 47 appears across either resistor 55, 55', the rectifier action preventing any reverse flow and consequent shorting out of the resistors through the low impedance output circuits of the tubes 47. The two grids of the tubes 57 are therefore excited alternately, one grid being at the mean bias-potential for positive swings, the other assuming that potential for negative swings. The combined current for the two halves of tube 57, flowing in the anode resistor 63, accordingly increases and decreases alternately to give the desired output to the load circuit. The tube 57 has been shown as a conventional anode coupled amplifier; it could equally well be coupled as cathode follower if such a connection were advisable to match an output circuit of low impedance. The anode circuit coupling has been shown primarily to indicate the versatility of the invention; high impedance output circuits could also be used with either of the other two embodiments which have been illustrated.

While the advisability of low output impedance in the circuits feeding the rectifiers has been mentioned repeatedly, it will be seen that this is a matter of degree only and that a very considerable benefit can be derived from the invention even though the output impedance of the preamplifier is matched to the impedance which it supplies. In considering specifically the circuit shown in Fig. 3, we may assume an effective output impedance of each tube 47, for illustrative purposes, as 300 ohms. Because of the inevitable small nonuniformities in the magnetic coating of the tape, it will be a rare circumstance when the output voltage developed by the two tubes is exactly equal, and in this case the effective impedance of the amplifier as a whole will be that of a single tube and the impedance of each of the resistors 55, to achieve a match, would also be 300 ohms. A drop-out in either track would not affect this. What would affect it most would be the relatively rare circumstance when the voltages developed on the two tracks were precisely equal. The available voltage across the resistors 55 would then increase by one-third, increasing the signal by 2.5 db. If the two channels were merely connected in parallel through an output circuit instead of being connected through the comparator circuit using the rectifiers, the matching impedance to the two tubes in parallel would be 150 ohms. In the case of drop-out we would have a 300 ohms circuit feeding 100 ohms, the effective voltage across the output circuit would be reduced by one-half, or 6 db. There is thus a 3.5 db gain in constancy of output through the use of the present invention even under the least favorable circumstances. In the case of two series-connected circuits from dual tracks, not using the present invention, the losses would be of the same order of magnitude as in the case of the parallel connection in the event that a drop-out occurs.

Where the comparator circuit feeds an unmatched but higher impedance, the effect of a drop-out decreases very rapidly as the impedance ratio between the amplifier and the effective load upon it increases. Thus if the resistors 55 have only ten times the value of resistor 49 the difference between an exact equality of signal and a drop-out is only four percent in voltage or less than $1/10$ db. If the value of resistors 55 is increased by another order of magnitude, to 30,000 ohms, the difference in voltage between a drop-out and no drop-out becomes less than one-half of one percent. With resistor 55 of the order of one-half megohm the effect of a drop-out in either channel becomes vanishingly small.

In the absence of the present invention the higher the impedance fed by two parallel tracks the greater will be the effect of a drop-out. The loss will never be less than 6 db and with a very high impedance load would be as complete as though both of two tracks dropped out simultaneously.

Figure 4:
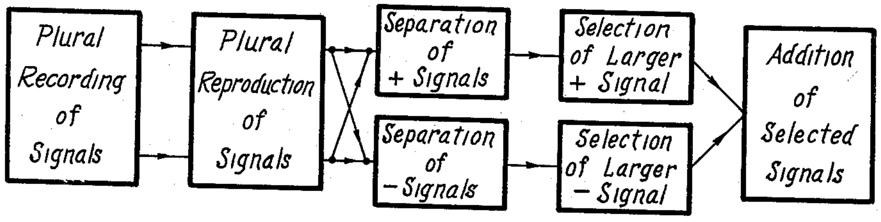
Fig. 4 is a flow diagram, representing the steps in the method utilized in all the embodiments of the invention.

While the various embodiments of the invention which have been described differ markedly in circuitry, and while many more embodiments could be illustrated, wherein, for example, vacuum-tube diodes were substituted for the contact rectifiers which have been illustrated or where the separation of the signals into their positive and negative halves occurred at different stages of amplification or before amplification, the principles upon which all embodiments operate is the same. This is illustrated in the block diagram of Fig. 4, which is, in effect, a flow-sheet designating the steps in the method that is employed in all of the embodiments mentioned. The first and necessary step upon which all of the succeeding steps are based is the plural recording of signals, symbolized at the left of the diagram of Fig. 4, which must precede the reproduction of the nominally identical signals, which constitutes the next step. There follows the concurrent segregation or separation of the plus and minus signals respectively from the two or more channels wherein the signals have been reproduced, and the comparison and selection of the largest of the signals compared, both plus and minus. The final step is the re-combination of the positive and negative signals to form the final, reconstructed signal.

In any practical embodiment of the invention all of the signals would be amplified somewhere between the pick-up and the load circuit, but since the amplification could be effected after the selection of the maximal signal and since such amplification is normally considered an inherent feature of the reproduction of magnetically recorded signals it is not shown as a separate step.

In view of the wide variety of equipment which can be used to embody the invention, the actual equipment illustrated is not to be considered as limiting its scope, all intended limitations being expressed in the following claims.

What is claimed is:

1. Reproducing apparatus for magnetically recorded signals comprising a plurality of transducer heads adapted to engage respectively a plurality of tracks on a moving magnetic recording medium, a separate signal channel connected to each of said transducer heads, two sets of interconnections between said channels, means in one set of interconnections for separating from signals developed in each of said channel portions of one polarity and selecting therefrom the portion of greatest magnitude, means in the other set of interconnections for separating from the signals developed in each channel portions of opposite polarity and selecting therefrom the portion of greatest magnitude, and means for combining the selected portions to form a single complete signal.

2. Reproducing apparatus for magnetically recorded signals comprising a plurality of transducer heads adapted to engage respectively a plurality of tracks on a moving magnetic recording medium, an independent signal channel connected to each of said transducer heads, a first rectifier connected in each channel to pass current only when the signal developed therein is of one polarity, a second rectifier connected in each channel to pass current only when the signal developed therein is of opposite polarity, a load impedance connected in parallel to all of said first rectifiers, a second load impedance connected in parallel to all of said second rectifiers, and means for combining additively the signals developed across said load impedance.

3. Reproducing apparatus for magnetically recorded signals comprising a plurality of transducer heads adapted to engage respectively a plurality of tracks on a moving magnetic recording medium, an independent signal channel having a relatively low effective output impedance connected to each of said transducer heads, a first rectifier connected to the output of each channel to pass current only when the signal developed therein is of one polarity, a second rectifier connected in each channel to pass current only when the signal developed therein is of opposite polarity, a first relatively high load impedance connected in parallel to all of said first rectifiers, a second relatively high load impedance connected in parallel to all of said second rectifiers, and means for combining the potentials developed across said two load impedances to form a complete signal.

4. Reproducing apparatus as defined in claim 3 wherein each of said channels terminates in a push-pull connection, said load impedances are connected in series, and the first and second rectifiers are similarly poled and connect opposite sides of said push-pull connections to opposite terminals of said series-connected load impedances.

5. Reproducing apparatus as defined in claim 3 wherein all of said first rectifiers are similarly poled and connect from one side of said channels to said first load impedance, and all of said second rectifiers are oppositely poled to said first rectifiers and connect from the same side of said channels as said first rectifiers to said second load impedance.

6. In combination in reproducing apparatus for magnetically recorded signals to obtain the reproduction of signals recorded on a pair of tracks where the instantaneous magnitude of the signals may be at any value in a range of magnitude values, a pair of transducing means disposed in coupled relationship to the pair of tracks to produce signals in accordance with the signals previously recorded in the tracks, electrical circuitry coupled to the pair of transducing means for continuously passing signals from both of the tracks, and comparison means included in the electrical circuitry for rendering the electrical circuitry responsive only to the signals from the track in which the magnitude of the signal is higher at any instant than the signals from the other track.

7. In combination in reproducing apparatus for magnetically recorded signals to obtain the reproduction of signals recorded on a pair of tracks where the instantaneous amplitude of the signals may be at any one of a number of different values in a range of values, a pair of transducing means disposed in contiguous relationship to a pair of tracks to obtain the production of electrical signals in accordance with the signals previously recorded in the tracks, means including an amplifier and bias means coupled to the pair of transducing means for continuously comparing the amplitude of the signals reproduced by the pair of transducing means from the pair of tracks for the passage at each instant of the signal having the higher amplitude from the pair of tracks being reproduced, and means including a load responsive to the signals from the last mentioned means for obtaining the reproduction of the signals passing through the last mentioned means.

8. In combination in reproducing apparatus for magnetically recorded signals to obtain the reproduction of signals having amplitudes falling anywhere within a range of amplitudes and recorded on each of a pair of tracks. transducing means responsive to the signals recorded in the tracks for reproducing the signals, first amplifier means responsive to the signals reproduced by the transducer means from a first one of the tracks for amplifying the reproduced signals to provide amplified signals having different amplitudes falling anywhere within a particular range of amplitudes, second amplifier means responsive to the signals reproduced by the transducer means from a second one of the tracks for amplifying the reproduced signals to provide amplified signals having different amplitudes falling anywhere within a particular range of amplitudes, and means including unidirectional means responsive at each instant to the signals reproduced by the first and second amplifier means which signals may have any amplitude within the particular range of amplitudes, for providing for the passage at each instant only of the signals from one of the amplifier means and having an amplitude greater than the signal from the other amplifier means.

9. In combination in reproducing apparatus for magnetically recorded signals to obtain the reproduction of signals recorded on a pair of tracks, transducing means responsive to the signals recorded in the tracks for reproducing the signals, first amplifier means responsive to the signals reproduced by the transducer means from a first one of the tracks for amplifying the reproduced signals, second amplifier means responsive to the signals reproduced by the transducer means from a second one of the tracks for amplifying the reproduced signals, and means including unidirectional means responsive at each instant to the signals reproduced by the first and second amplifier means for providing for the passage at each instant only of the signals from one of the amplifier means and having an amplitude greater than the signal from the other amplifier means, the last mentioned means including first and second transformers each coupled to a different one of the amplifier means and each having a winding with an intermediate tap, said unidirectional means being coupled electrically to the intermediate-tapped windings in the first and second transformers, and an intermediate-tapped winding in a third transformer coupled electrically to the unidirectional means to receive the signals passing through the undirectional means.

10. In combination in reproducing apparatus for magnetically recorded signals to obtain the reproduction of signals recorded on a pair of tracks, transducing means responsive to the signals recorded in the tracks for reproducing the signals, first amplifier means responsive to the signals reproduced by the transducer means from a first one of the tracks for amplifying the reproduced signals, second amplifier means responsive to the signals reproduced by the transducer means from a second one of the tracks for amplifying the reproduced signals, and means including unidirectional means responsive at each instant to the signals reproduced by the first and second amplifier means for providing for the passage at each instant only of the signals from one of the amplifier means and having an amplitude greater than the signal from the other amplifier means the last mentioned means including first and second capacitances coupled electrically to the first and second amplifier means, the unidirectional means being coupled to the capacitances, and load means coupled to the unidirectional means to obtain the reproduction at each instant of only the signal having the greatest amplitude.

11. In combination in reproducing apparatus for magnetically recorded signals to obtain the reproduction of signals recorded on a pair of tracks, a pair of transducer means disposed in coupled relationship to the pair of tracks to produce signals in accordance with the signals previously recorded in the tracks, first electrical circuitry coupled to each of said transducing means for distinguishing between the signals of one polarity and the signals of the other polarity in the signals passed by said associated transducing means, second electrical circuitry coupled to said first electrical circuitries for passing the signals at each instant from one of the tracks which signals are of said one polarity and have particular characteristics relative to the signals of said one polarity produced from the other track, third electrical circuitry coupled to the first electrical circuitries for passing the signals at each instant from said one of the tracks which signals are of said other polarity and have particular characteristics relative to the signals of said other polarity produced from the other track, and means coupled to said second electrical circuitry and to said third electrical circuitry for reconstructing a single composite signal from the detected and passed signals therefrom.

References Cited in the file of this patent

UNITED STATES PATENTS

| | | |
|---|---|---|
| 2,628,346 | Burkhart | Feb. 10, 1953 |
| 2,793,344 | Reynolds | May 21, 1957 |
| 2,813,259 | Burkhart | Nov. 12, 1957 |
| 2,816,162 | Johnson | Dec. 10, 1957 |